(12) United States Patent
Yoshida

(10) Patent No.: US 11,738,304 B2
(45) Date of Patent: Aug. 29, 2023

(54) EXHAUST GAS PURIFICATION SYSTEM

(71) Applicant: NAGASE & CO., LTD., Osaka (JP)

(72) Inventor: Norifumi Yoshida, Miki (JP)

(73) Assignee: NAGASE & CO., LTD., Osaka (JP)

( * ) Notice: Subject to any disclaimer, the term of this patent is extended or adjusted under 35 U.S.C. 154(b) by 102 days.

(21) Appl. No.: 17/297,200

(22) PCT Filed: Nov. 29, 2019

(86) PCT No.: PCT/JP2019/046750
§ 371 (c)(1),
(2) Date: May 26, 2021

(87) PCT Pub. No.: WO2020/111224
PCT Pub. Date: Jun. 4, 2020

(65) Prior Publication Data
US 2022/0023796 A1  Jan. 27, 2022

(30) Foreign Application Priority Data

Nov. 29, 2018  (JP) ................................. 2018-223362

(51) Int. Cl.
| | |
|---|---|
| *B01D 47/06* | (2006.01) |
| *B01D 47/14* | (2006.01) |
| *B01F 23/21* | (2022.01) |
| *B01D 53/18* | (2006.01) |
| *C02F 1/74* | (2023.01) |
| *C02F 3/02* | (2023.01) |

(Continued)

(52) U.S. Cl.
CPC ............. *B01D 53/18* (2013.01); *B01D 47/06* (2013.01); *B01D 47/14* (2013.01); *B01F 23/214* (2022.01);

(Continued)

(58) Field of Classification Search
CPC .... B01F 23/213; B01F 23/2132; B01D 47/06; B01D 47/14; B01D 23/214
See application file for complete search history.

(56) References Cited

U.S. PATENT DOCUMENTS 5,141,538 A    8/1992 Derington

FOREIGN PATENT DOCUMENTS

| CN | 202576152 U | * 12/2012 |
|---|---|---|
| CN | 204170594 U | * 2/2015 |

(Continued)

OTHER PUBLICATIONS

Extended European Search Report for European Patent Application No. 19890359.3 dated Jul. 21, 2022 (8 sheets).

(Continued)

*Primary Examiner* — Robert A Hopkins
(74) *Attorney, Agent, or Firm* — Kratz, Quintos & Hanson, LLP

(57) ABSTRACT

The present invention provides an exhaust gas purification system. In the exhaust gas purification system, a shower nozzle 20 disperses liquid toward exhaust gas 11 from an upper portion of the exhaust gas 11. The dispersed liquid is mixed with the exhaust gas 11 and thereafter, the liquid accumulates in a tank 30, and odor and oil content are dissolved by action of microorganism included in the liquid in the tank 30. The shower nozzle 20 is connected to an opening 24 horizontally provided in a nozzle pipe 23 connected to a liquid-supply pipe conduit 22. The exhaust gas purification system includes a nozzle 20N directed to a downward dispersing direction of the liquid. The nozzle 20N is placed in the nozzle pipe 23 such that a lower end 20L of the nozzle 20N is located higher than a bottom 25 of an inner wall of a pipe conduit of the nozzle pipe 23. According to this, exhaust gas including odor and oil content is purified.

7 Claims, 2 Drawing Sheets

(51) Int. Cl.
  *B01F 23/213* (2022.01)
  *C02F 101/32* (2006.01)
(52) U.S. Cl.
  CPC ............ *B01F 23/2132* (2022.01); *C02F 1/74* (2013.01); *C02F 3/02* (2013.01); *B01D 2252/103* (2013.01); *C02F 2101/32* (2013.01)

(56) References Cited

FOREIGN PATENT DOCUMENTS

| CN | 205435311 U | | 8/2016 |
|---|---|---|---|
| JP | H07-075730 A | | 3/1995 |
| JP | H09-117635 A | | 5/1997 |
| JP | H09117635 A | * | 5/1997 |
| JP | 2004-016924 A | | 1/2004 |
| JP | 2006-320828 A | | 11/2005 |
| JP | 2008-126129 A | | 6/2008 |
| KR | 10-1541890 B1 | | 8/2015 |

OTHER PUBLICATIONS

Taiwan Office Action Search Report of corresponding Taiwan Patent Application No. 108143774 dated May 20, 2022 (1 sheet, 1 sheet translation, 2 sheets total).
Korean Office Action for Korean Patent Application No. 10-2021-7014839 dated Aug. 4, 2022 (6 sheets).
International Search Report for International Application No. PCT/JP2019/046750 dated Feb. 10, 2020 (2 sheets).

* cited by examiner

[Fig. 1]
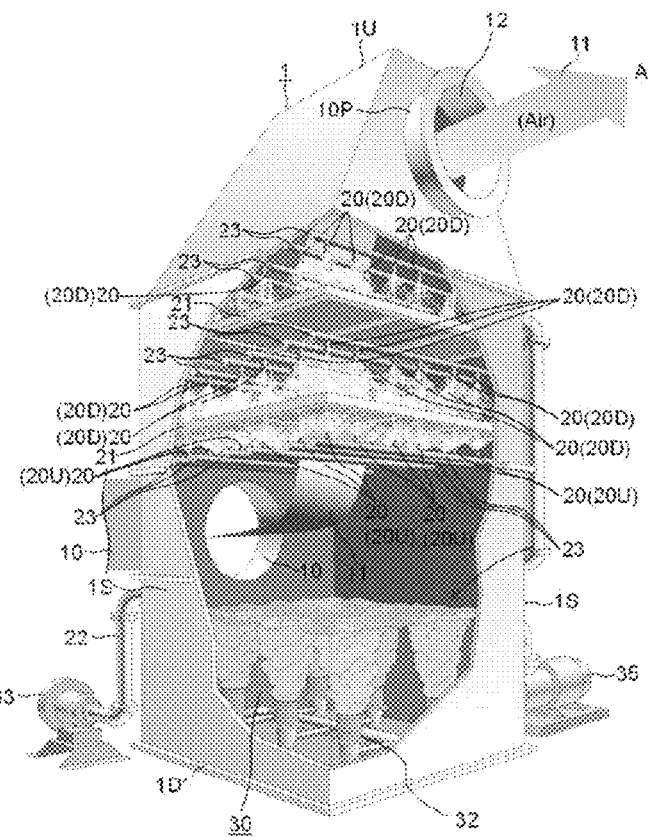
[Figs. 2]
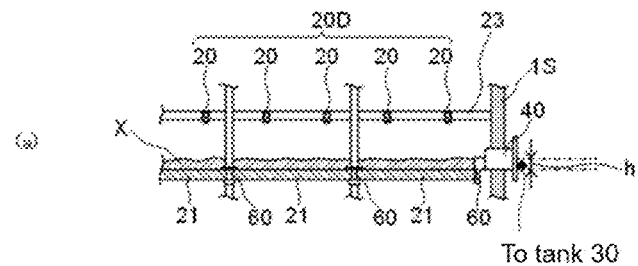
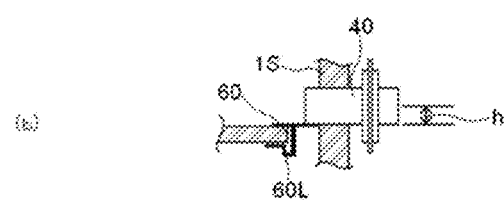

[Figs. 3]
(a)
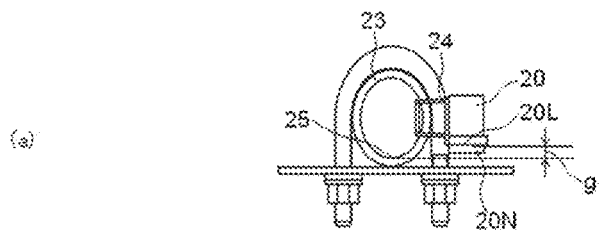
(b)
[Fig. 4]
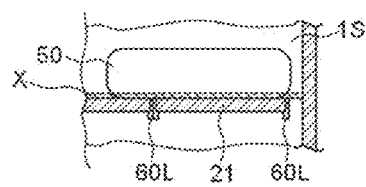

EXHAUST GAS PURIFICATION SYSTEM

TECHNICAL FIELD

The present invention relates to an exhaust gas purification system for purifying exhaust gas including odor and oil content.

BACKGROUND TECHNIQUE

In recent years, while environmental problem is emphasized, there is growing need for treatment of exhaust gas including odor and smoke. In order to meet this need, a purification device is used, odor or smoke included in the exhaust gas is separated from the exhaust gas and is removed.

However, in the case of the conventional purification device to purify the exhaust gas, ability to purify the exhaust gas is the highest when usage of the device is started, and after the usage is started, the ability necessarily declines as time passes. In order to maintain the purifying ability above the standard, it is necessary to frequently exchange specific members in most of the cases, and there is a problem that running cost becomes high. On the other hand, a technique to treat sewage by aerobic microorganism is proposed, it is unnecessary to frequently exchange the specific members and this technique has a merit (see patent document 1).

PRIOR ART DOCUMENT

Patent Document

[Patent Document 1] Publication of Japanese Patent No. 3952386

SUMMARY OF THE INVENTION

Problem to be Solved by the Invention

An exhaust gas purification system as described in patent document 1 is provided with a spraying portion composed of a plurality of shower nozzles placed in a purifying exhaust gas passage, odor or oil in the exhaust gas is introduced to a tank by a shower, sewage is purified by aerobic microorganism, liquid sprayed from the shower nozzle of the spraying portion is circulated and supplied from the tank to the spraying portion using a pump. In this case, since liquid sprayed from the shower nozzle is sewage, there is a problem that the shower nozzle becomes clogged.

Means for Solving the Problem

The present invention has been accomplished in view of such a circumstance, and an exhaust gas purification system 1 of the present invention for purifying exhaust gas 11 including odor and oil content includes: a purification exhaust gas passage for transporting the exhaust gas 11 including the odor and the oil content; a shower nozzle 20 for dispersing liquid toward the exhaust gas 11 from an upper portion of the exhaust gas 11 transported by the purification exhaust gas passage; a tank 30 for storing the liquid dispersed from the shower nozzle 20; a liquid-supply pipe conduit 22 connected between the tank 30 and the shower nozzle 20 for supplying the liquid in the tank 30 to the shower nozzle 20 using a pump 33; and an aeration device 32 for supplying gas including oxygen to the liquid in the tank 30 and for oxidatively decomposing organic material included in the exhaust gas 11; wherein the shower nozzle 20 disperses the liquid toward the exhaust gas 11 from the upper portion of the exhaust gas 11, the dispersed liquid is mixed with the exhaust gas 11 and thereafter, the liquid is accumulated in the tank 30, the odor and the oil content are dissolved by action of microorganism included in the liquid in the tank 30, the shower nozzle 20 is connected to an opening 24 horizontally provided in a nozzle pipe 23 connected to the liquid-supply pipe conduit 22, the shower nozzle 20 includes a nozzle 20N which is directed in a dispersing downward direction of the liquid, and the shower nozzle 20 is placed in the nozzle pipe 23 such that a lower end 20L of the nozzle 20N is located higher than a bottom 25 of an inner wall of a pipe conduit of the nozzle pipe 23.

A breathable screen 21 may be provided below the shower nozzle 20 at a predetermined distance h from, the shower nozzle 20, and the screen 21 may receive the liquid which passes through the exhaust gas 11. The exhaust gas purification system 1 may further include an overflow pipe 40 which is provided below the shower nozzle 20 and provided at a predetermined distance from an upper surface of the screen 21, and which bypasses liquid X accumulated on the upper surface of the screen 21 to the tank 30.

The exhaust gas purification system 1 may further include an inspection opening 50 having a lower end located higher than the upper surface of the screen 21. The screen 21 may be supported on a side wall portion 1S of the exhaust gas purification system 1 through a rail 60, and the rail 60 may be provided with a reversed-L shaped liquid puddle 60L located lower than a lower surface of the screen 21. A liquid passing diameter D of the nozzle 20N may be 5 m or greater.

Effect of the Invention

According to the above-described configurations, an effect of the aeration device which supplies sufficient oxygen to liquid including organic material and oxidative decomposes the liquid is enhanced, and even if oil content or fine waste remains in liquid which could not be treated, there is an effect that the shower nozzle is less prone to become clogged.

BRIEF DESCRIPTION OF THE DRAWINGS

FIG. 1 is a partial sectional perspective view showing an exhaust gas purification system: according to an embodiment of the present invention;

FIG. 2(a) is a sectional view showing screens and an overflow pipe of the exhaust gas purification system, and FIG. 2(b) is an enlarged view of these portions;

FIG. 3(a) is an enlarged sectional view of a shower nozzle and a pipe of the exhaust gas purification system, and FIG. 3(b) is a bottom view of the shower nozzle; and FIG. 4 is a partial sectional view showing an inspection opening and the screens of the exhaust gas purification system.

MODE FOR CARRYING OUT THE INVENTION

An embodiment of the present invention will be described below with reference to the drawings. As shown in FIG. 1, an exhaust gas purification system 1 according to the embodiment is connected to a purification exhaust gas duct 10 provided in an restaurant or the like, and the exhaust gas purification system 1 is mainly composed of a plurality of shower nozzles 20 plated above purification exhaust gas 11, a tank 30 for storing water dispersed from the shower nozzles 20, and a liquid-supply pipe conduit 22 which connects the tank 30 and the shower nozzles 20 to each other and which supplies liquid to the shower nozzles 20 from the tank 30.

The exhaust gas purification system 1 is formed into a rectangular cylindrical shape including an upper plate portion 1U, a lower plate portion 1D and right and left side wall portions 1S. The exhaust gas purification system 1 is provided at its lower portion with the tank 30. An aeration device 32 is placed in the tank 30. A pump 33 which supplies liquid from the tank 30 to the shower nozzles 20 through the liquid-supply pipe conduit 22 is connected to the tank 30. Purification exhaust gas 11 which enters from the purification exhaust gas duct 10 provided along a substantially horizontal direction by an exhaust gas fan 10P provided on an upper portion of the exhaust gas purification system 1 passes through a space above the tank 30 and the purification exhaust gas 11 is discharged toward outside air A from an opening 12. The many shower nozzles 20 which disperse liquid toward the purification exhaust gas 11 which is sucked toward the opening 12 are placed below the opening 12 of the exhaust gas purification system 1. The shower nozzles 20 include shower nozzles 20D which disperse liquid in a direction (downward direction) opposed to a suction direction (upward direction in FIG. 1) of the exhaust gas 11, and shower nozzles 20U which disperse liquid in the same direction as the suction direction. The shower nozzles 20D and the shower nozzles 20U are placed horizontally and the shower nozzles 20 are formed into a two stage configuration. Screens 21 having many metal breathable meshes are place between the shower nozzles 20 at a predetermined distance h (15 cm with plus or minus 5 cm) from the shower nozzles 20. Dispersed liquid is accumulated in and received by the screens 21.

As shown in FIG. 2, liquid X dispersed from the shower nozzles 20 provided above the screens 21 is mixed with exhaust gas 11, absorbs odor and oil content and accumulates on the screens 21. An overflow pipe 40 which bypasses liquid X accumulating on upper surfaces of the screens 21 to the tank 30 is provided below the shower nozzles 20 at a predetermined distance h from an upper surface of the screens 21 such that an upper surface of the accumulated liquid X does not come into contact with lower ends 20L (see FIG. 3) of the shower nozzles 20. Since a lower half of the opening which is opposed to the screens 21 of the overflow pipe 40 is closed (not shown), the predetermined distance (h) is equal to a distance between the upper surfaces of the screens 21 and a center of the overflow pipe 40 accurately as shown in FIG. 3. By providing the overflow pipe 40, it is possible to prevent the shower nozzles 20 from coming into contact with the accumulated liquid X, and prevent the shower nozzles 20 from becoming clogged.

A mechanism for supplying liquid to the shower nozzles 20 will be described next. Liquid from the liquid-supply pipe conduit 22 is supplied to the shower nozzles 20 through nozzle pipes 23 which are placed in a horizontal direction and which support the shower nozzles 20, and the liquid is dispersed toward the exhaust gas 11. The liquid dispersed front the shower nozzles 20 is dispersed from an upper portion of the exhaust gas 11 toward the exhaust gas 11.

As shown in FIG. 3, the shower nozzles 20 are connected to openings 24 horizontally provided in the nozzle pipes 23 connected to the liquid-supply pipe conduit 22. The shower nozzles 20 include nozzles 20N directed to a dispersing direction of liquid, and the nozzles 20N are placed on and fixed to the nozzle pipes 23 such that the lower ends 20L of the nozzles 20N are located higher than bottoms 25 of pipe conduit inner walls of the nozzle pipes 23 by a predetermined distance g. When the exhaust gas purification system 1 stops, liquid is brought to a standstill in the nozzle pipes 23, but since the lower ends 20L of the nozzles 20N are placed higher than the bottoms 25 of the pipe conduit inner walls of the nozzle pipes 23 by the predetermined distance g, liquid does not stop at the lower ends 20L of the nozzles 20N. If liquid stops, organic material of liquid when dried may be a cause of clogging of the nozzles 20N. If a liquid passing diameter of the nozzle 20N is set to 5 mm or greater, it is possible to further prevent the nozzles 20N from becoming clogged.

According to the exhaust gas purification system 1, as shown in FIG. 4, the side wall portions 1S are provided with inspection openings 50 so that internal inspections can be carried out and the screens 21 can be replaced, installed and repaired. Each of the inspection openings 50 is placed such that its lower end is located above an upper surface of the screen 21. According to this, maintainability is enhanced. A height of the inspection opening 50 is adjusted such that when it is opened, the lower end thereof is located above the upper surface of the screen 21 such that liquid X staying on the upper surface of the screen 21 does not overflow from the inspection opening 50 and an operator does not get the liquid X on himself or herself. Each of the screens 21 is supported on the side wall portion 1S of the exhaust gas purification system 1 through a rail 60. The rail 60 is provided with reversed-L shaped liquid puddles 60L located below a lower surface of the screen 21. The reversed-L shaped liquid puddles 60L hold liquid X staying between the screen 21 and the rail 60. The reversed-L shaped liquid puddles 60L prevent the exhaust gas 11 from moving from between the screen 21 and the rail 60, prevent the exhaust gas 11 from blowing up, and prevent a purifying function of the exhaust gas 11 from being deteriorated. According to this, the exhaust gas 11 upwardly passes through the screen 21 uniformly from the breathable meshes of the screen 21 and the exhaust gas 11 is discharged from the opening 12. According to such a configuration, effects of the aeration device 32 which supplies sufficient oxygen to liquid including organic material to oxidatively decompose the same is enhanced.

The aeration device 32 provided in the tank 30 is a device for sending air to liquid (liquid dispersed by the shower nozzles 20 comes into contact with the exhaust gas 11 and includes oil content or organic material) stored in the tank 30. The aeration device 32 makes air supplied from an air pump 35 provided outside the tank 30 into foam and sends the air into the tank 30. The air which is sent into the tank 30 oxidatively decomposes organic material included in water by the action of oxygen which constitutes a portion of the air. To make a height of water stored in the tank 30 constant, an inner wall of the tank 30 is provided with a float (not shown), and water is additionally supplied from outside.

Next, operation of the exhaust gas purification system 1 will be described.

First, by operating the pump 33, liquid (mixture of water and organic material) stored in the tank 30 is sent into the liquid-supply pipe conduit 22. The liquid which is sent into the liquid-supply pipe conduit 22 is supplied to the respective shower nozzles 20 through the nozzle pipes 23, and the liquid (mainly water) is dispersed from the shower nozzles 20 to the exhaust gas 11 in a showering manner. The liquid which is dispersed from the shower nozzles 20 in the showering manner collides against odor and oil content included in the exhaust gas 11, and drops to the screen 21 together with the odor and the oil content. The dropped water liquid becomes liquid X which accumulates on the upper surface of the screen 21, and next flows into the tank 30 through the reversed-L shaped liquid puddles 60L.

By operating the air pump 35, air is supplied to the aeration device 32. Oxygen included in the air supplied from the aeration device 32 in the tank 30 causes oxidation reaction on organic material included in the liquid, and the organic material is dissolved. Aerobic enzyme (naturally generated in the tank 30) acts in the tank 30 and the dissolving is promoted. Liquid (water) which is obtained by dissolving and treating odor and oil content in this manner is again supplied to the shower nozzles 20 by the pump 33.

Most of odor and oil content included in the exhaust gas 11 is removed from the exhaust gas 11 generated especially in a factory, and the exhaust gas 11 is discharged to outside air A.

According to such a configuration, effects of the aeration device 32 that sufficient oxygen is supplied to liquid including organic material to cause oxidative decomposition are enhanced, and even if oil content or fine waste remains, the shower nozzle is less prone to become clogged and maintainability is also enhanced.

EXPLANATION OF SYMBOLS 1 exhaust gas purification system
1D lower plate portion
1U upper plate portion
1S side wall portion
10 exhaust gas duct (purification exhaust gas passage)
10P exhaust gas fan
11 exhaust gas
12 opening
20, 20D, 20U shower nozzle
20L lower end
20N nozzle
21 screen
22 liquid-supply pipe conduit
23 nozzle pipe
24 opening
25 bottom
30 tank
32 aeration device
33 pump
35 air pump
40 overflow pipe
50 inspection opening
60 rail
60L puddle of liquid
A outside air
D liquid passing diameter
g predetermined distance
h predetermined distance
X accumulated liquid

The invention claimed is:

1. An exhaust gas purification system for purifying exhaust gas including odor and oil content, comprising:

a purification exhaust gas passage for transporting the exhaust gas including the odor and the oil content;

a shower nozzle for dispersing liquid toward the exhaust gas from an upper portion of the exhaust gas transported by the purification exhaust gas passage;

a tank for storing the liquid dispersed from the shower nozzle;

a liquid-supply pipe conduit connected between the tank and the shower nozzle for supplying the liquid in the tank to the shower nozzle using a pump; and an aeration device for supplying gas including oxygen to the liquid in the tank and for oxidatively decomposing organic material included in the exhaust gas;

wherein the shower nozzle disperses the liquid toward the exhaust gas from the upper portion of the exhaust gas, the dispersed liquid is mixed with the exhaust gas and thereafter, the liquid is accumulated in the tank, the odor and the oil content are dissolved by action of microorganism included in the liquid in the tank, wherein the shower nozzle is connected to an opening horizontally provided in a nozzle pipe connected to the liquid-supply pipe conduit, the shower nozzle includes a nozzle which is directed in a dispersing downward direction of the liquid, and the shower nozzle is placed in the nozzle pipe such that a lower end of the nozzle is located higher than a bottom of an inner wall of a pipe conduit of the nozzle pipe, wherein a breathable screen is provided below the shower nozzle at a predetermined distance from the shower nozzle, and the screen receives the liquid which passes through the exhaust gas, and wherein the screen is supported on a side wall portion of the exhaust gas purification system through a rail, and the rail is provided with a reversed-L, shaped liquid puddle located lower than a lower surface of the screen.

2. The exhaust gas purification system according to claim 1, further comprising an overflow pipe which is provided below the shower nozzle and provided at a predetermined distance from an upper surface of the screen, and which bypasses liquid accumulated on the upper surface of the screen to the tank.

3. The exhaust gas purification system according to claim 1, further comprising an inspection opening having a lower end located higher than the upper surface of the screen.

4. The exhaust gas purification system according to claim 1, wherein a liquid passing diameter of the nozzle is 5 mm or greater.

5. The exhaust gas purification system according to claim 2, further comprising an inspection opening having a lower end located higher than the upper surface of the screen.

6. The exhaust gas purification system according to claim 2, wherein a liquid passing diameter of the nozzle is 5 mm or greater.

7. The exhaust gas purification system according to claim 3, wherein a liquid passing diameter of the nozzle is 5 mm or greater.

* * * * *